United States Patent [19]

Nichols

[11] Patent Number: 4,675,374

[45] Date of Patent: Jun. 23, 1987

[54] SOLVENTLESS POLYMERIC COMPOSITION REACTION PRODUCT OF (1) ADDUCT OF AMINE AND ACRYLATE WITH (2) POLYACRYLATE

[76] Inventor: Gus Nichols, 2501 Gulf Freeway, Building 18, Unit 5, Dickenson, Tex. 77539

[21] Appl. No.: 757,511

[22] Filed: Jul. 18, 1985

Related U.S. Application Data

[62] Division of Ser. No. 593,591, Mar. 26, 1984, Pat. No. 4,547,562.

[51] Int. Cl.$^4$ .............................................. C08G 83/00
[52] U.S. Cl. .................................. 528/119; 525/423; 525/426; 525/430; 525/524; 525/526; 525/533; 528/112; 528/114; 528/121; 528/310; 528/327; 528/332; 528/335; 528/341; 528/345; 528/363
[58] Field of Search ............... 528/119, 112, 114, 121, 528/310, 327, 332, 335, 341, 345, 363; 525/423, 426, 430, 524, 526, 533

[56] References Cited

U.S. PATENT DOCUMENTS

| | | | |
|---|---|---|---|
| 2,978,433 | 4/1961 | Hurwitz | 260/45.2 |
| 3,196,124 | 7/1965 | Gaylord | 260/30.6 |
| 3,247,163 | 4/1966 | Reinking | 260/47 |
| 3,367,992 | 2/1968 | Bearden | 260/837 |
| 3,445,441 | 5/1969 | Rushton | 260/89.5 |
| 3,494,891 | 2/1970 | McWhorter et al. | 260/47 |
| 3,551,246 | 12/1970 | Bassemir et al. | 156/272 |
| 3,551,311 | 12/1970 | Nass et al. | 204/159.18 |
| 3,616,040 | 8/1971 | Toback | 156/310 |
| 3,635,867 | 1/1972 | Yuille | 260/29.4 |
| 3,773,739 | 11/1973 | Terni et al. | 260/78 |
| 3,845,056 | 10/1974 | Robson et al. | 260/268 |
| 3,899,611 | 8/1975 | Hall | 427/54 |
| 3,971,834 | 7/1976 | Uzelmeier et al. | 260/837 |
| 4,020,123 | 4/1977 | Prapasso | 260/837 |
| 4,180,632 | 12/1979 | Ilenda | 521/184 |
| 4,198,331 | 4/1980 | Buchwalter et al. | 260/29.2 |
| 4,230,834 | 10/1980 | Sirota | 525/308 |
| 4,273,632 | 6/1981 | Zarnegar | 204/159.15 |
| 4,284,742 | 8/1981 | Bowerman et al. | 525/329 |
| 4,324,713 | 4/1982 | Kita et al. | 523/457 |
| 4,393,195 | 7/1983 | Gaku et al. | 528/361 |
| 4,410,680 | 10/1983 | Brownscombe et al. | 528/88 |
| 4,431,781 | 2/1984 | Paar | 525/502 |
| 4,435,548 | 2/1984 | Tomalia et al. | 525/451 |
| 4,547,562 | 10/1985 | Nichols | 528/363 |

OTHER PUBLICATIONS

Sherwin Williams Technical Bulletin 169, Sherwin Williams Company, Cleveland, Ohio (1981).

*Primary Examiner*—Harold D. Anderson
*Attorney, Agent, or Firm*—Neal J. Mosely

[57] ABSTRACT

Solventless polymeric compositions suitable for coatings and moldings are formed by the addition reaction product of a first component comprising mono, di or polyamines, or an adduct of mono, di or polyamines with mono, di or polyfunctional acrylates and/or epoxides and a second component comprising mono, di or polyacrylates or mixtures with mono, di or polyepoxides.

13 Claims, No Drawings

SOLVENTLESS POLYMERIC COMPOSITION REACTION PRODUCT OF (1) ADDUCT OF AMINE AND ACRYLATE WITH (2) POLYACRYLATE

This is a divisional of my co-pending application Ser. No. 593,591 filed Mar. 26, 1984 which is the parent application issuing as U.S. Pat. No. 4,547,562.

BACKGROUND OF THE INVENTION

I. Field of the Invention

The present invention relates to solventless polymeric compositions and, more particularly, to generally liquid, low viscosity polymeric compositions which polymerize by means of an addition reaction mechanism.

II. The Prior Art

Many different types of liquid polymeric materials are known in the prior art and are used in numerous applications. For example, liquid polymeric compositions can be used for paints, coatings and films, or can be poured into molds or substrates to make castings. However, the various physical properties of these polymeric compositions present certain problems in many applications. For example, compositions having generally high viscosities or rapid reaction rates are difficult to apply as films or coatings without the use of solvents to dilute or dissolve the components. This normally creates pollution problems, however, when the solvent evaporates. Additionally, as the solvents evaporate they can leave voids or blisters in the polymeric material.

Accordingly, there exists a need in the art for solventless liquid polymeric compositions which can be used in paints and coatings, and which can be poured into molds to make castings. As used herein, the term "solventless" means the absence of any solvent in the components utilized to make the polymeric composition which does not take part in the reaction. Thus, upon mixing the various components, there is no solvent to be evaporated or entrapped into the resulting thermosetting polymeric materials. In other words, the whole system is 100% active and there is no waste through solvent evaporation. Under such solventless conditions, compact films or parts are formed which are void free, since there are no solvent losses through evaporation or solvent entrapments to cause porosity and blistering.

Furthermore, the absence of solvents eliminates environmental pollution caused by solvent loss. In this respect, solventless systems are even better than water borne polymeric materials because the latter contain small quantities of ammonia, amines and solvents used as water emulsifiers, solubilizers and stabilizers. Conventional solution polymeric materials used for coatings and paints contain substantial amounts of solvents or water which are lost by evaporation to the environment. Solventless systems have no evaporation problems and provide economy with their efficiency.

Based on the same weight and thickness of a coating, solventless polymeric systems provide considerably more surface coverage than solution systems because the solventless systems are 100% active. In addition, solventless systems are more compact with respect to production capacity, storage room, transportation room, and are safer, with less attendant health and fire hazards.

The best solventless compositions are thermoset through an addition polymerization mechanism. This simply means that component A reacts with component B by adding to it without the formation of any volatile by-products which could cause voids, blisters or entrapments in the film or part. These polymers can include ladder-like type polymers wherein the components are cross-linked spacially in the form of a ladder. For example, two linear parallel polymeric chains are intersected at their repeated reaction sites by components which form the steps of the spacial ladder.

The few ladder polymers which are known generally in the art have exceptionally good chemical resistance. However, these compositions are generally solids and are insoluble in organic solvents. Additionally, these ladder-type polymers generally have to be heated above 180° C. to effect curing. Thus, it is extremely difficult to use a ladder-type composition as a paint or coating.

It would also be advantageous to have a solventless polymeric composition in which the various components are liquids with relatively low viscosities at ambient temperatures. Such systems would be advantageous because they could be conveniently applied as coatings by spraying, dipping, brushing, rolling, or the like.

Additionally, liquid, solventless compositions can be more easily mixed together with pigments, pigment extenders, dyes, fillers, carbon, glass or organic fibers without the necessity of dilution with solvents. Low viscosities greatly facilitate any grinding process and the absence of solvents reduces the fire hazard caused by the heat of friction in the presence of volatile and flammable organic solvents. Thus, the systems can readily be utilized to make paints and coatings.

Conventionally known polymeric materials used in coatings and paints have typically been of one or two component systems. The one component systems are generally always water borne and comprise solution or emulsion type materials in organic solvents such as oil alkyds, epoxy esters, urethane oils, and latexes. Two component systems generally include:

(a) solid or liquid epoxides and polyamines, or amine terminated polyamides;
(b) isocyanate terminated polyurethanes and di or polyols, hydroxyl terminated polyurethanes and/or p,p'methylene,o,o', chloro dianiline;
(c) unsaturated polyesters; and
(d) photoprepolymers.

Presently available one component liquid polymeric systems have several distinct disadvantages. For example, the compositions can only be applied in thin coats so that the solvent can evaporate. Additionally, as the solvent evaporates, it can leave voids or blisters.

The two component systems also have certain disadvantages. For example, these systems which include epoxides have required a solvent to dissolve the epoxides such that they can be easily applied. Even the normally liquid diepoxides such as those based on Bisphenol A and epichlorohydrin (exemplified by EPON-826 and EPON-828 sold by Shell Chemical Company and others), have viscosities greater than about 4,000 centipoise (CPS) at ambient temperatures. Other liquid di or polyfunctional diepoxides of glycidyl ethers with Bisphenol A, as well as the liquid diepoxides of Novolac type, have viscosities much greater than 4,000 centipoise. When these liquid epoxides are cured with polyamines such as triethylene tetramine (TETA), or liquid amine-terminated polyamides such as the Versamides produced by General Mills Company, additional solvents must be used to reduce the viscosity. This is because when the epoxide and amines are mixed together, there is no viscosity decrease, but rather a rapid increase due to the high reactivity and functionality of TETA with the epoxides.

Both isocyanate and hydroxyl-terminated polyurethanes such as Adiprene L-100, Adiprene L-150 (produced by E. I. duPont de Nemours & Company of Wilmington, Del.), Multrathene-2680, Desmophens and Desmodurs (produced by Mobay Co.) have viscosities in excess of 18,000 centipoise or are solids at ambient temperature. Therefore, these compounds cannot be used as components of a liquid, solventless system.

Unsaturated polyesters such as the condensation product of maleic anhydride, phthalic anhydride or isophthalic acid with 15% to 25% molar excess of 1,2 propylene glycol diluted with 30% to 50% by weight of styrene monomer have been used as good, solventless systems when combined with 1% by weight of a ketone hydroperoxide catalyst and 0.3% by weight cobalt naphthoate as an accelerator. However, the volatility of the odorous styrene monomer, the highly critical 100/1/0.03 weight ratio and the very rigid and inflexible thin films which are produced make the styrene diluted unsaturated polyester system unsuitable for coatings or paints. However, these unsaturated polyesters are broadly used in combination with fiberglass to produce reinforced plastics.

Perhaps most similar to solventless systems are photoprepolymers composed of di or polyfunctional acrylates diluted with monofunctional acrylates containing polymerization inhibitors, photoinitiators (catalysts), and photoaccelerators (tertiary amines). However, these formulated prepolymers have limited storage life and have to be protected from contact with ultraviolet light. Additionally, the curing of these compositions requires strong sources of ultraviolet light or electron beam. These sources are generally accompanied by strong infrared light which causes evaporation of the unpleasantly smelling monoacrylic esters. Additionally, only films of a few mils in thickness can be fully cured. As soon as the surface of the photo prepolymer is exposed to ultraviolet light or electron beam it hardens, thus inhibiting further penetration of the ultraviolet light. This self inhibition problem of photoprepolymers is even more acute if the polymer contains pigments or fillers. Thus, photoprepolymers are generally limited to applications requiring very thin, and preferably clear, films.

In view of the foregoing, it is obvious that it would be a significant advancement in the art to provide a solventless polymeric composition which could be used for coatings and paints and also which could be poured into substrates or molds to form castings. It would be still a further advancement if such a solventless system had a liquid consistency of a relatively low viscosity at ambient temperatures.

SUMMARY OF THE INVENTION

The present invention provides solventless polymeric compositions formed from the reaction product of a first component comprising mono, di or poly amines, amine-terminated structures or an adduct of mono, di or polyamines with mono, di or polyfunctional acrylates or epoxides; and the second component comprising mono, di or polyacrylates, mixtures of mono, di or polyacrylates, or a mixture of mono, di or poly acrylates and mono, di or polyfunctional epoxides and/or glycidyl esters of acrylic acid or methacrylic acid.

In a first embodiment, the first and second components are formulated such that they are both liquids having a relatively low viscosity at ambient temperatures. Thus, the components can be mixed together and can be applied as a coating or paint by spraying, dipping, brushing, or rolling, or they can be poured into substrates or molds to make castings.

In a second embodiment, the first component comprises a mono, di or polyamine, hydrazine, or an aminohydrazine terminated derivative and mixtures thereof either alone or in combination with mono, di or poly acrylates. The second component comprises a mono, di or poly acrylate and the first and second components are mixed together in proportions such that the number of acrylate linkages are in excess of the aminic hydrogens so as to form a photoprepolymer. This photoprepolymer can be utilized to form thin films or sheets and can be further polymerized by ultraviolet light or an electron beam.

In a third embodiment of the present invention, anhydrides are added to the first component which is then mixed with the second component to form a solid or liquid composition which thermosets upon heating.

DETAILED DESCRIPTION OF THE PREFERRED EMBODIMENTS

Generally

The present invention is directed to a series of new solventless polymeric compositions which can be applied as films, coatings or paints by rolling, brushing or spraying, or can be poured into substrates or molds to form void free solid castings.

The compositions comprise mixtures of amines, acrylates, epoxides, carboxylic acids, and anhydrides which are mixed together in predetermined amounts and orders so as to allow the reactants to react by an addition polymerization mechanism to form ladder-like structures.

In one embodiment of the invention, the components of the polymeric composition are formulated so as to form two liquid components which have a relatively low viscosity and can be separately stored for a year or more. When the two components are mixed together, they form a liquid composition which thermosets at ambient temperatures within a few hours without having to heat the composition. As used herein, ambient temperatures generally refers to temperatures between about 40° F. and 90° F. However, systems within the scope of the present invention will also set at higher and lower temperatures depending upon their viscosities and reactivities.

Because the components and the resulting mixture, for a short period of time, are liquids at ambient temperatures, the composition is easy to work with. Additionally, because the system is solventless, there are no solvents to evaporate and cause pollution or form blisters and voids in the final product.

In this embodiment, the first liquid component is formed from mono, di or polyamines, mixtures of mono, di or polyamines, or adducts of mono, di or polyamines with mono, di or polyacrylates or epoxides. The amount of acrylate or epoxide that must be added to the amine is dependent upon the actual compounds used. The basic requirement is that the component be a liquid of relatively low viscosity at ambient temperatures and have at least two reactive aminic hydrogens so that it can polymerize Examples of suitable mixtures are more fully discussed hereinafter.

The second liquid component is formed from mono, di or polyacrylates, mixtures of mono, di or polyacrylates, or adducts of mono, di or polyacrylates with mono, di or polyfunctional epoxides and/or glycidyl ethers of acrylic acid or methacrylic acid. The amount of acrylates and epoxides in the second component is dependent upon the number of aminic hydrogens in the first component. If a fully cured system is desired, the number of acrylic linkages, that is, the number of acrylic C=C double bonds, and epoxides should be equal to the number of aminic hydrogens. If a photoprepolymer, as more fully discussed hereinafter, or a "living" polymer which can be further cured by ultraviolet light is desired, the number of acrylic linkages should exceed the number of aminic hydrogens.

In a second embodiment of the invention, mono, di or polyamines are mixed with mono, di or polyacrylates to form solventless photoprepolymers. The amines and acrylates are chosen and mixed such that there is an excess of acrylic linkages over aminic hydrogens. A photoinhibitor such as hydroquinone and a photoinitiator such as p,p'dichlorobenzophenone are preferably added to the mixture. Because the amines react with the acrylates and epoxides to form tertiary amines, these photoprepolymers do not require the addition of additional photoaccelerators.

In a third embodiment of the invention, di or polyamines are mixed with mono or diacrylates followed by the addition of monofunctional anhydrides or carboxylic acidanhydrides and epoxides. These compositions form liquid low melting solids which thermoset upon heating above about 140° C. throuqh an addition polymerization.

The Reaction Components

The Amines

The useful amines of this invention are either individual members or classes of amines or their mixtures represented by the general structure $R_n(NH_2)_n$. When $n=1$, the class of mono amines results having the general formula $RNH_2$ wherein R is a monovalent radical of aliphatic, cycloaliphatic, heterocyclic or aromatic structure and their combinations. Normally the R radical is composed of carbon and hydrogen atoms, but can also contain oxygen, sulfur, halogens (i.e., chlorine, bromine, fluorine, iodine) and their combinations in addition to carbon and hydrogen. Accordingly, the term "monoamine", in addition to what are generally referred to as simple amines, involves hydroxyl, ether, keto, ester, amide, imide, thiol, thio, sulfone, nitrile and urea mono amines.

The following specific examples of mono amines are given by way of illustration only, and without to limit the scop of this invention.

Useful mono amines are: ethanol amine, 2 ethyl-hexyl amine, nonyl amine, hexadecyl amine, octadecyl amine, the aceto amide of trimethyl 1,6 hexamethylene diamine, the methyl ester of undecanoic omega amino acid, the monophthalimide of polyoxopropylene diamine-230 (Jeffamine D-230, a product of Texaco Chemicals Co.), furfuryl amine, aniline, chloro aniline, toluidine, toloyl amine, 1,3 amino propylene nitrile, 1,6 urea hexamethylene amine, and the like.

When $n=2$ the class of diamines results having the general formula $R_2(NH_2)_2$ wherein $R_2$ is a divalent radical of aliphatic, cycloaliphatic, heterocyclic or aromatic structure and/or various combinations. $R_2$ can also contain (in addition to carbon and hydrogen atoms), oxygen, sulfur, halogens and their combinations. Accordingly, the term "diamine" is extended, and covers in addition to the simple diamines, the hydroxyl, ether, keto, ester, amide, imide, thiol, thio, sulfono, nitrile and urea diamines, as well as hydrazine and hydrazine terminated hydrazides. Hydrazine results from the formula $R_2(NH_2)_2$ when $R_2$ is nil.

The following examples of diamines are given by way of illustration without limit to the scope of this invention.

Useful diamines of this invention are: hydrazine; ethylene diamine; 1,4 butylene diamine; 1,6 hexamethylene diamine; Amine-6 (which is a mixture of: 1,6 hexamethylene diamine; 2 methyl, 1,5 pentamethylene diamine; and 1,2 cyclohexamethylene diamine); 1,2 cyclohexamethylene diamine; p,p' methylene biscyclohexamethylenediamine (PAMC-20, a product of Du Pont Co.); metaxylylene diamine; isophorone diamine; trimethyl, 1,6 hexamethylene diamine; metaphenylene diamine; 1,7 napthalene diamine; p,p' methylene dianiline; p,p' methylene, o,o' chroro dianiline (MOCA); p,p' oxo or sulfono dianiline; polyoxopropylene diamine-230, 400, 600, 900, 2000, (known as Jeffamines which are produced by Texaco Chemical Co.); and monododecenylsuccimide of polyoxopropylene triamine-400 (Jeffamine T-403, a product of Texaco Chemical Co.). The adducts of any of these specific diamines with mono, di or poly acrylates or epoxides by using at least 2 to 1 equivalents of diamine versus epoxide or acrylate bond. For example, the diamines which are obtained by mixing 2.0 moles of 1,6 hexamethylene diamine and 0.5 moles of p,p' isopropylidine bisphenol diglycidyl ether (also known as Bisphenol A) or 1.0 mole 1,6 hexamethylene diol dimethyl acrylate.

Other illustrative diamines are the condensation products of 1.0 mole oxalic acid, adipic acid, azelaic acid, sebacic acid, dodecanedioic acid, dimer fatty acid, isophthalic or terephthalic acids (or their dimethyl esters) with 2.0 moles of PAMC-20 or polyoxopropylene diamine-400 (Jeffamine D-400) through the elimination of 2.0 moles of water (or methanol). Other illustrative diamines are N,N' dioxopropylene (Jeffamine D-230), urea hydrazine, the dihidrazide of dimer fatty acid and the like.

When $n=3$ the class of triamines results having the general formula $R_3(NH_2)_3$. For $n=3,4,5...$ the generic term of polyamine is used. Wherein $R_3$ is a tri (or poly) valent radical having an aliphatic, cycloaliphatic, heterocyclic or aromatic structure and their combinations. Simple $R_3$ groups are composed of carbon and hydrogen atoms, but in the present invention can also include oxygen, halogen, sulfur, nitrogen and their combinations. Tri (or poly) amines can be simple or may contain in their backbone hydroxyl, ether, keto, halogen, ester, amide, imide, thio, thiol, sulfone, urea, hydrazide or their combinations, and include analogues, substituted derivatives, higher or lower homologues, as well as their adducts with either mono, di or poly functional acrylates or epoxides wherein at least 2/1 molar ratios of tri or poly amine to mono, di or poly functional acrylate or epoxide has been used. The same molar ratios of at least 2/1 are also applicable to the condensation products of a tri (or poly) amine with oxalic acid, malonic acid, adipic acid, azelaic acid, sebacic acid, dimer fatty acid, isophthalic acid, terephthalic acids (or their methyl or ethyl esters), trimellitic anydride and urea.

The below given examples of tri (or poly) amines are by way of illustration only, without limiting the scope of this invention.

Illustrative examples of tri (or poly) amines are: diethylene triamine, dipropylene triamine, polyoxopropylene triamine-400 (Jeffamine T-403, a product of Texaco Chemical Co.), triethylene tetramine (TETA), tetraethylene pentamine, 2,4-Bis (p-aminobenzyl) aniline (BABA, a product of the du Pont Co.) and bis hexamethylene triamine (BHMT, a product of the du Pont Company). Additional tri or poly amines include amines obtained by the reaction of 1.0 mole of melamine with 3.0 moles of a diamine; the adducts obtained from the addition reaction of 2.0 moles of TETA with 1.0 mole of diglyceridyl ether of bisphenol A or 1.0 mole of tetraoxoethylene glycol dimethyl acrylate; the adduct of 3.0 moles of 1,6 hexamethylene diamine with 1.0 mole of trimethylol propane triacrylate; the condensation reaction product of 1.0 mole dimer fatty acid, adipic acid, oxalic acid, terephthalic acid, or trimellitic anyhydride with 2.0 moles of Jeffamine T-403 or 1.0 mole urea with 2.0 moles of Jeffamine T-403.

The Acrylates

Mono, di or poly functional acrylates useful in this invention are those having aliphatic, cycloaliphatic, or aromatic structures and their combinations. In addition, adducts of acrylates with mono, di or poly amines in which an excess of at least 2/1 of di (or poly) functional acrylate per amino hydrogen are also useful in this invention.

Illustrative examples of mono functional acrylics are: acrylonitrile, methyl acrylonitrile, acrylamide, methyl acrylamide, N-methylol acrylamide, N-methylol methyl acrylamide, N,N' dimethylol acrylamide, N,N' dimethylol methyl acrylamide, diacetone acrylamide, diacetone methyl acrylamide, hydroxyl ethyl acrylate, hydroxyl propyl acrylate, as well as the methyl ester, ethyl ester, butyl ester, 2-ethyl hexyl ester, bornyl ester and stearyl esters of acrylic acid or methyl acrylic acid, crotonic acid, phenyl acrylic acid or phenyl methyl acrylic acid. Additional acrylates include the adducts of 1.0 mole diethanol amine to 1.0 mole of 1,6 hexamethylene diol acrylate, and 1.0 mole aniline to trimethylol propane triacrylate.

Illustrative examples of difunctional acrylates are the diacrylates and dimethyl acrylates of: 1,4 butylene diol, neopentyl glycol, oxodiethylene glycol, oxotriethylene glycol, oxotetraethylene glycol, oxo polyethyleneglycols (300, 400, 600), 1,6 hexamethylene diol, oxodi- propylene glycol, oxotetra propylene glycol, N,N' methylene bis acrylamide or bis methyl acrylamide, wherein the terms diol and glycol are synonymous. Also included are the adducts of 1.0 mole of dodecyl amine with 1.0 mole of pentaerythritol tetra acrylate; 1.0 mole of diethanol amine to 1.0 mole of trimethylol ethane triacrylate or trimethylol propane triacrylate.

Illustrative examples of tri (or poly) functional acrylates are: the triesters of acrylic acid, or methyl acrylic acid, with trimethylol ethane, trimethylol propane, and pentaerythritol; the adduct of 1.0 mole monoethanol amine to 1.0 mole of penta erythritol tetra acrylate or penta erythritol tetramethyl acrylate; the adduct of 1.0 mole of dodecyl amine to 2.0 moles of trimethylol propane triacrylate or 2.0 moles of penta erythritol tetra acrylate; the adduct of 1.0 mole 1,6 hexamethylene diamine, or Amine-6 with 4.0 moles of 1,6 hexamethylene diol diacrylate.

The Epoxides

Illustrative examples of mono, di or poly functional epoxides are: ethylene oxide, propylene oxide, butylene oxide, styrene oxides, and RD-4 (a product of the CIBA-GEIGY Co.). Compounds containing one epoxide and one acrylate or methyl acrylate structure in a single molecule are exemplified by the glycidyl ester of acrylic or methacrylic acid. Diepoxides include the diglycidyl ether of isopropylidine bisphenol (Bisphenol A) such as EPON-826 EPON-828 (products of the Shell Chemical Co.) and their equivalent compounds produced by DOW, CIBA and others. Other examples include Novolac liquid diepoxides exemplified by DOW-431, DOW-439 and their equivalent compounds from CIBA Co., as well as any other liquid or low melting solid mono, di or poly epoxide. Cycloaliphatic diepoxides such as Bis-cyclohexane or Bismethyl cyclohexane adipate or glycolate diepoxides such as are manufactured by Union Carbide and CIBA-GEIGY Co. can also be used in the present invention.

ADDITION POLYMERIZATION MECHANISM

It was discovered that the addition polymerization of amines or hydrazine with acrylates are generally exothermic, and take place at ambient temperatures or below with the exception of aromatic amines. The rate of reaction is greater with primary than secondary amines. Also, hydrazine reacts faster than aliphatic primary diamines which in turn react faster than cycloaliphatic diamines, which in turn react faster than aromatic diamines with acrylates which in turn are more reactive than their methyl or alkyl substituted analogues. In fact, while aliphatic, cycloaliphatic, or heterocyclic amines react exothermically with acrylates and methyl acrylates at ambient temperatures, aromatic mono, di or poly amines usually have to be heated from about 100 to 160° C. for one to two hours in order to effect their addition polymerization.

The maximum stoichiometric addition of an amine and an acrylate involves the addition of all aminic hydrogen atoms to acrylate or methyl acrylate double bonds. For example, a secondary amine (imine) represented by the general structure

wherein R, and R' are monovalent radicals, reacts stoichiometrically with an acrylate represented by the general structure $CH_2=CXY$ wherein X is equal to hydrogen, methyl, or an alkyl radical, and Y is equal to:

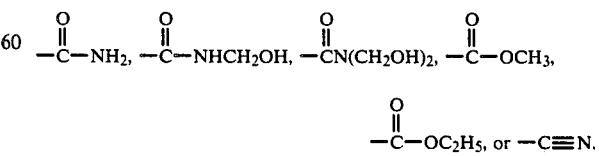

The following equations are illustrative of addition reactions between secondary amines (imines) and acrylates:

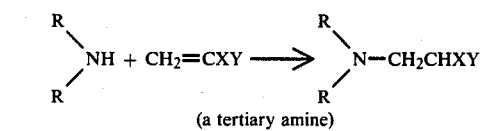 (1)

(a tertiary amine)

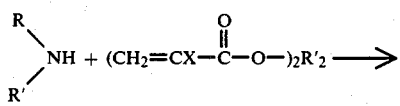 (2)

(a monomeric tertiary amine mono acrylate)

R'₂ equals —(CH₂)$_n$— or —(CH₂CH₂—O)$_n$ and
—OR'₂O—equals —NHCH₂NH—

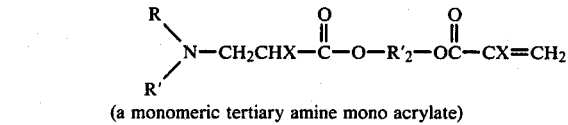 (3)

(a monomeric tertiary amine diacrylate)

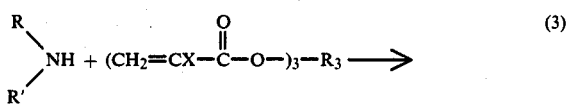 (4)

A monomeric tertiary amine (n−1) acrylate. Wherein R, R', R₂, R'₂, R₃ ... R$_n$ respectively are: mono, di, tri or polyvalent radicals.

The replacement of an imine

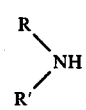

with a primary amine results when R' equals H an leads to the following possibilities:

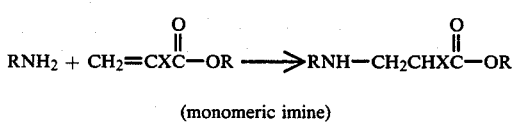 (5)

(monomeric imine)

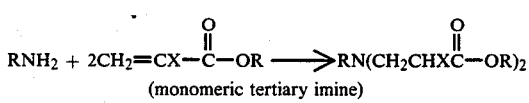 (6)

(monomeric tertiary imine)

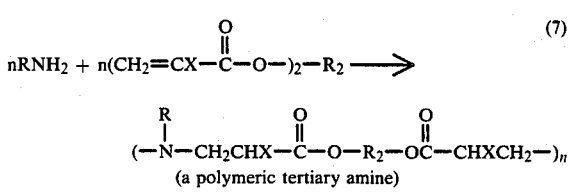 (7)

(a polymeric tertiary amine)

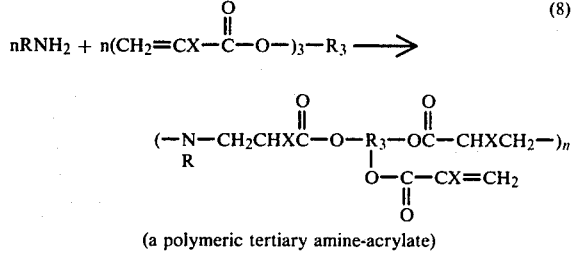 (8)

(a polymeric tertiary amine-acrylate)

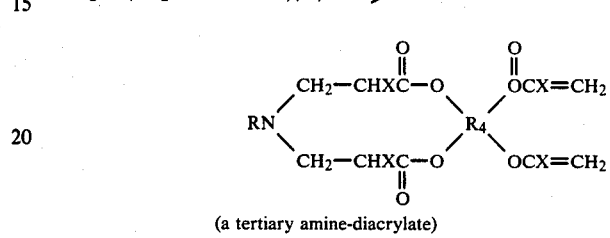 (9)

(a tertiary amine-diacrylate)

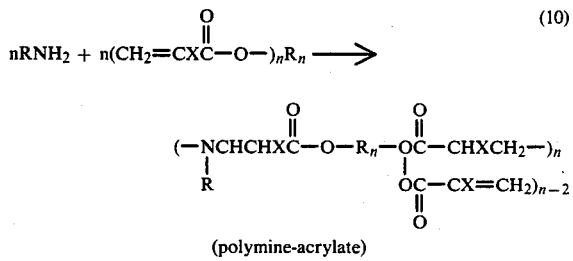 (10)

(polymine-acrylate)

The replacement of a primary amine RNH₂ with a diimine having the structure R₂(NHR)₂ leads to the following possibilities:

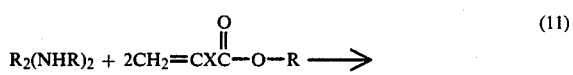 (11)

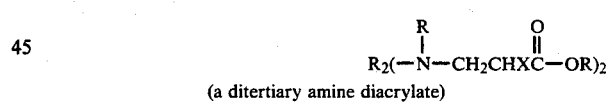

(a ditertiary amine diacrylate)

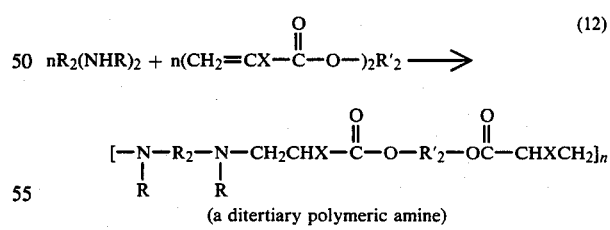 (12)

(a ditertiary polymeric amine)

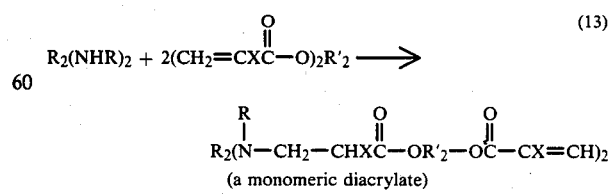 (13)

(a monomeric diacrylate)

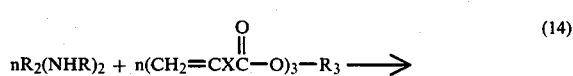 (14)

-continued

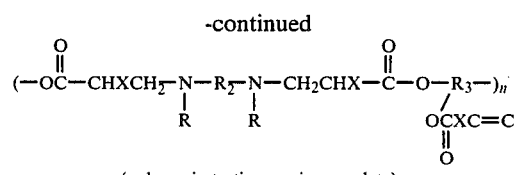
(polymeric tertiary amine acrylate)

 (15)

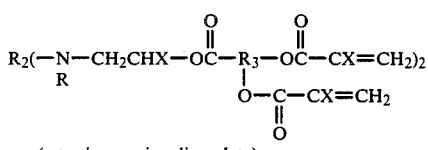
(a tertiary amine-diacrylate)

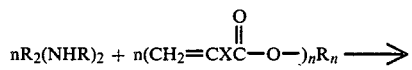 (16)

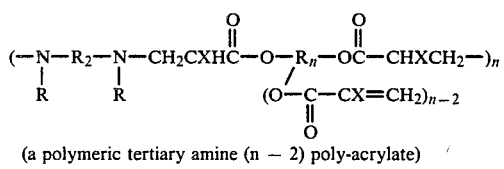
(a polymeric tertiary amine (n − 2) poly-acrylate)

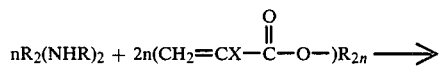 (17)

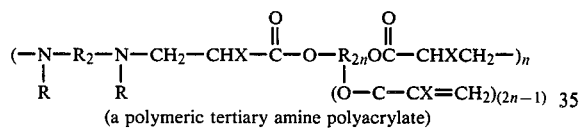
(a polymeric tertiary amine polyacrylate)

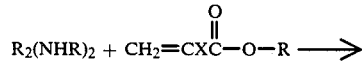 (18)

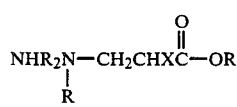

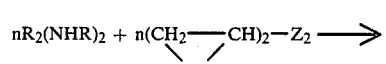 (19)

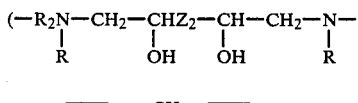

Where $Z_2$ is 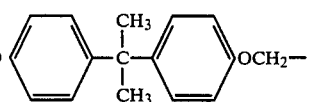

-continued
(an adduct of a diimine with a diepoxide)

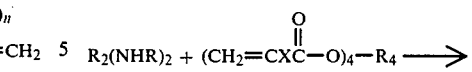 (20)

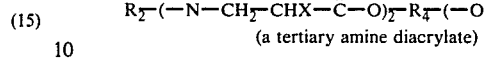
(a tertiary amine diacrylate)

The replacement of a diimine with a primary diamine or hydrazine and their amine or hydrazine terminated diprimary amines or hydrazines rapidly increases their possibilities and their stochiometrical combinations, illustrated by the following examples:

$R_2(NH_2)_2 + 4CH_2=CXC(=O)-OR \longrightarrow$ (21)

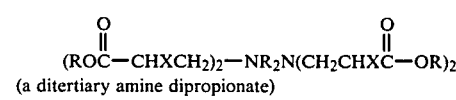
(a ditertiary amine dipropionate)

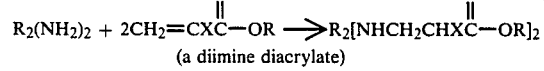 (22)
(a diimine diacrylate)

$nR_2(NH_2)_2 + n(CH_2=CXC(=O)-O-)_2R'_2 \longrightarrow$ (23)

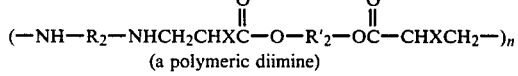
(a polymeric diimine)

$2NH_2-R_2-NH_2 + (CH_2=CXC(=O)-O-)_2R'_2 \longrightarrow$ (24)

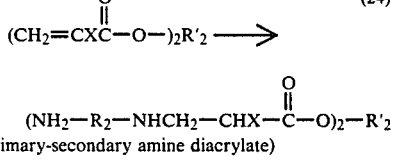
(a diprimary-secondary amine diacrylate)

$NH_2-R_2-NH_2 + (CH_2=CXC(=O)-O-)_3-R_3 \longrightarrow$ (25)

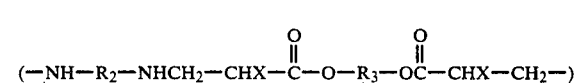

(a polymeric diimine monoacrylate which rapidly crosslinks at ambient temperatures)

(26) The case of (23) can be further reacted by diepoxides to form ladder like polymers as follows:

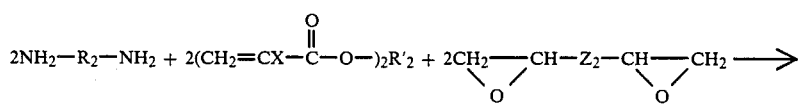

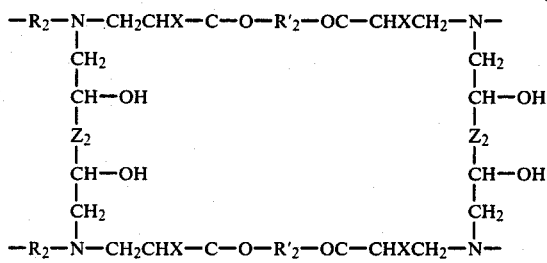

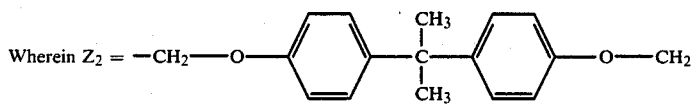

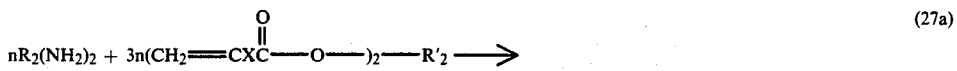  (27a)

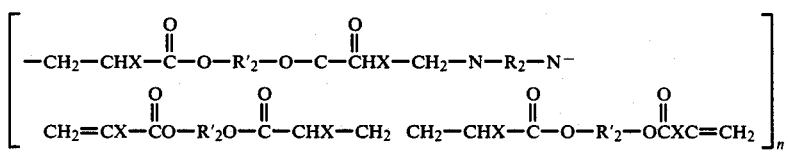

(a polymeric N,N' diacrylate)

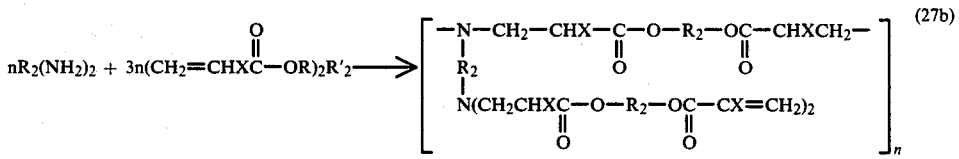  (27b)

Equations 27(a) and 27(b) are based on exactly the same ingredients and molar ratios but due to the different sequence of addition, the final products are isomeric polymeric diacrylates. Equation 27(a) contains the mono acrylate linkages distributed on both nitrogen atoms and is a polymeric diimine. In the case of Equation 27(b) a polymeric amine containing two acrylate linkages on one nitrogen atom is formed.

These last two equations indicate how the manipulation of the sequence of addition results in isomeric products. Equation 27(a) results by allowing 1.0 mole of a diamine to react with 1.0 mole of a diacrylate until a high viscosity is obtained, and then adding it into 2.0 moles of diacrylate and mixing. Equation 27(b) results by slowly adding 1.0 mole of diamine to 3.0 moles of diacrylate under controlled conditions.

The following polytertiary amine octaacrylate gels very quickly, unless it is highly inhibited.

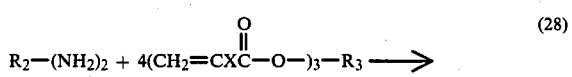  (28)

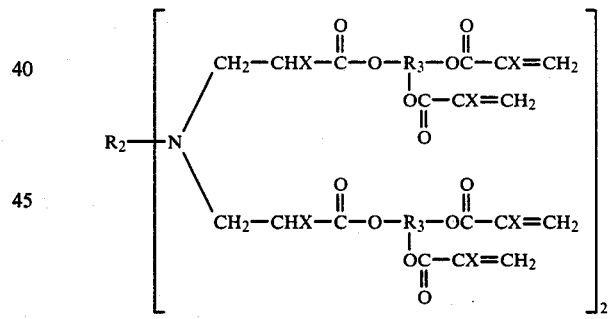

It was found that the addition reaction between di or poly amines and mono, di or poly functional acrylates in the presence or absence of mono, di or poly functional epoxides are of a general nature and with the exception of aromatic amines, take place exothermically at ambient temperatures. Furthermore, it was found that the addition reaction between mono, di or poly amines and mono, di or poly functional acrylates, as well as the exothermic reactions of mono, di or poly amines with mono, di or poly epoxides proceeds faster with the acrylate reactants than with the epoxides.

Since mono, di or poly acrylates do not react with mono, di or poly epoxides, the addition reactions between mono, di or poly amines and mono, di or poly functional acrylates diluted with mono, di or poly epoxides predominantly proceeds, at first as an addition of aminic hydrogen atoms to acrylate bonds, and then the remaining aminic and iminic hydrogens add to the epoxide rings. Consequently, mono, di or poly acrylates can be used as solvents for mono, di or poly epoxides to significantly reduce their viscosities and both the solute and solvent enter into the addition polymerization reactions upon mixing with mono, di or poly amines.

Thus, although solid mono, di or poly amines or epoxides can also be used in the present invention, the criterion for solventless two component systems is that the resulting components A and B, after dilution with mono, di or poly functional acrylates should be liquids of relatively low viscosity. If the resulting components are solid, or very viscous liquids, they have to be diluted with inert solvents in order to reduce their viscosities to 1500 cps or below, but such systems are no longer solventless.

If the addition of mono, di or poly acrylates (or methyl acrylates) to mono, di or poly amines is in equivalent excess of at least one or more acrylate linkages over the iminic hydrogens, then the resulting liquid monomeric, oligomeric or polymeric compositions are novel photoprepolymers. Such photoprepolymers are stabilized by inhibiting them with up to 100 parts per million hydroquinone, ditertiary butyl hydroquinone, hydroxyl ethyl quinone or hydrobenzoquinone or other acrylate inhibitors to protect them from ultraviolet light and sunlight during storage. About 1% by weight of a photoinitiator such as p,p' chlorobenzoquinone or hydroxybenzoketones is also added to the system.

Equation 23 above can be further reacted with mono anhydrides or carboxylic acid anhydrides in the presence of liquid mono, di or poly epoxides to produce liquid or low melting solid one component systems. Thus, clear, pigmented or filled solventless molding powders or liquids thermosetting upon heating at above 150° C. are obtained.

It was found that primary or secondary amines react faster with mono anydrides or carboxylic acid anhydrides than with diepoxides at ambient temperatures. For example, 2n moles of a diamine represented by the general formula $H_2N—R_2—NH_2$ and 2n moles of diacrylate represented by the general formula

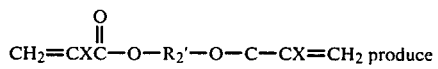

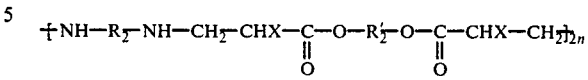

Addition of the above to 4n moles of methyl tetrahydrophthalic anhydride in the presence of 4 to 5 epoxide equivalents results in:

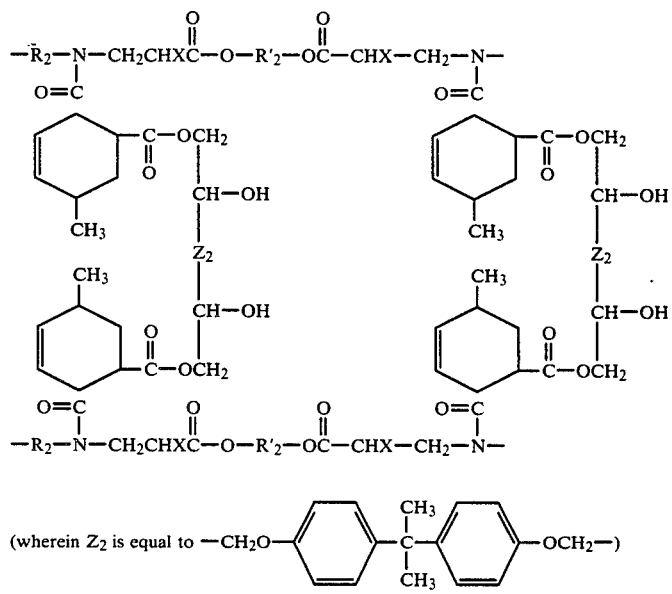

(wherein $Z_2$ is equal to $—CH_2O—\text{[bisphenol A]}—OCH_2—$)

Upon heating at above 150° C. the

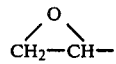

groups adds to oxiran or epoxide rings

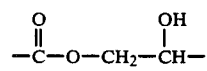

to form $$-\overset{O}{\underset{\|}{C}}-O-CH_2-\overset{OH}{\underset{|}{CH}}-$$

(hydroxy ester) linkages.

Also, it was found that the addition of 1 to 6%, or more, by weight to the component B composed of mono, di or poly acrylates, glycidyl esters of acrylic or methyl acrylic acids and/or mono, di or poly epoxides in their clear or pigmented form, of phenols, cresols, xylenols, naphthols, dihydroxy benzenes, dihydroxy naphthalenes, bisphenols and their mono or poly halo, nitro, ether, ester, alkyl, oxo, thio and sulfone substituted derivatives, isomers and homologues, followed by the equivalent mixing of component A and B catalyzes their poly addition reactions and signficantly reduces their thermosetting times. Thus, by using a suitable catalyst it is possible to react aromatic amines with acrylates at ambient temperatures rather than having to heat the mixture.

The addition of phenolic catalysts provides fast thermosetting times for equivalent mixtures of components A and B of the clear or pigmented solventless systems, thus causing a shorter pot life for the mixture. The most practical utilization of these precatalyzed solventless, two component systems is with airless (or air) dual guns which provide minimum mixing times.

APPLICATIONS

Liquid, solventless, two component systems of relatively low viscosity, which upon mixing thermoset at ambient temperatures through addition polymerization mechanisms proceeding in a "ladder" type formation yield compact, transparent, glossy and void free films or parts of any desired shape and thickness and are suitable for many applications. The use of air or airless spraying guns equipped with metering devices, ultrasonic mixing devices and pumping systems automatically mix only the specifically recommended ratios needed for spraying. If brushing is chosen with a solventless system as the method of application, the two components, A and B, should be well mixed for at least five minutes and then applied. Since there is no solvent evaporation there are minimal brushing marks resulting from constant changes in viscosity through evaporation of solvents. Additionally, from about one to about three weight percent of a surface tension reducer such as hexakis methoxy methylene melamine can be added to the system.

It was also found that the clear or the lightly filled form of the system provides 100% active varnishes, lacquers, or sealants of any desired thickness having 92% or better transparency of liquid consistency. The relatively low viscosity and high gloss of the solventless two component systems make them particularly useful in producing solar panels, and in casting optical devices and gyroscopes. Aluminum or copper water conduits also can be readily cast into place as integral parts of a solar panel.

Furthermore, the solventless, liquid two component systems of this invention can be applied as paints of various shades and thicknesses. It was found that one coat can provide thicknesses of up to 10 mils while providing outstanding gloss, non-yellowing characteristics and excellent ultraviolet light, salt water and chemical resistance. Suggested applications of such paints are in marine, maintenance, construction, vessel, automotive and aircraft industries.

The paints are tough through the combination of hardness greater than H-7 and impact (direct or reverse) resistance greater than 190 lbs/sq. in. When filled with 30 to 75% by weight fiberglass or fiber cloth, or carbon fiber they can replace unsaturated polyesters or epoxides in producing reinforced plastics for boats, tanks, corrugated sheets, bowling balls, bowling alleys, trays and chairs.

It was found that the solventless, liquid, two component systems of this invention can be mixed with up to 90% by weight silicon dioxide, alone or in combination with minor quantities of pigments or dyes to produce pliable plaster-like putties which set to ceramic like materials upon curing at ambient temperatures. Suggested applications are water and oil pipes, tiles, prefabricated buildings, highway light reflectors, oil platform coverage, industrial floors, fishing lures, etc. In other words, the solventless, liquid, two component system can be used either as clear pigmented or filled coatings and paints as well as liquid thermosetting polymers for coating or molding objects of any shape, size or dimension.

Furthermore, it was found that the liquid solventless, two component systems have outstanding adhesion to glass, bricks, ceramics, all metals including stainless steel, iron, aluminum, copper, titanium, chrome, tin, zinc, all thermosetting and thermoplastic polymers with the exception of polyolefins and polytetrafluorines. These latter polymers can be used as molds for the two component system of the present invention. Furthermore, since the solventless, two component systems of this invention are compatible (act as solvents) for liquid or solid asphalts, they can be used to form solventless polyacrylate epoxide tars containing from 2 to 98% by weight asphalt for clear, pigmented or filled systems. In addition to asphalts, other hydrocarbon resins such as alpha polymethylstyrene, polyvinyl carbazole, and polyterpenes can be used with the liquid solventless system of this invention. Other applications involve solventless adhesives for wood, Formica, glass, metals, polyvinyl chloride pipes, polystyrene, ABS plastics, ceramics, leathers, fabrics, metals, paper and their combinations. The main applications of these photoprepolymers which are one component liquid, clear or filled systems are in the construction of printed electrical circuits and photoresists.

Other applications will become apparent by the specific illustrative examples given below.

EXAMPLES

EXAMPLE 1

In an 800 ml. glass beaker were placed 2.0 moles (420 grams) of methylene bis cyclohexane diamine (PAMC-20, a product of Du Pont Co.) and 16 grams of hexakis methoxy, methylene m'elamine also known as CYMEL-301 (a product of American Cyanamide Co.). To this mixture were slowly added over a period of 15 minutes 0.442 moles (100 grams) of 1,6 hexamethylene diol diacrylate under continuous mixing, and water cooling, which continued for an additional 30 minutes. The resulting product was an adduct of PAMC-20 and 1,6 hexamethylene diol diacrylate, diluted with PAMC-20 and CYMEL-301, consisting of 0.442 moles of adduct, 1.116 moles of PAMC-20 and 16 grams of CYMEL-301. The adduct comprises the 2/1 molar addition to the acrylic double bonds of 1,6 hexamethylene diol diacrylate and proceeds exothermically at ambient or lower temperatures.

Separately, in another 2000 ml. glass beaker were mixed 720 grams (4.0 epoxide equivalents) of EPON-826 with 1.558 moles (352 grams) of 1,6 hexamethylene diol diacrylate.

The first mixture had a viscosity of about 230 centipoise (cps) at ambient temperature and for convenience was called component A, while the second mixture had a viscosity of 188 cps at ambient temperature and was named for convenience component B. The total weight of component A was equal to 420+16+100=536 grams, while the weight of component B was equal to 720+352=1072. The individual components A and B are stable in storage at ambient temperatures for periods in excess of one year without any significant change in viscosity.

The mixing stochiometrical weight ratio of component A to component B is equal to 536/1072=½. The mixing of 10 grams of component A with 20 grams of component B results in a liquid having an initial viscosity of about 200 cps which rapidly increases with time. However, this particular formulation has 50 to 60 minutes of pot life at ambient temperatures. Upon mixing component A with component B at a weight ratio of ½, the resulting mixture increases in viscosity as a function of time and finally solidifies within a few hours to a highly transparent, colorless, glossy, tough and void free film or part. The solidification process is a function of time and temperature and independent of thickness or size. Increased temperatures rapidly accellerate solidification, while decreased temperatures lower the rate of the mixture's solidification.

The involved chemical reactions proceed exothermically and apparently in the following order. First, the poly addition of the 2n moles of diamine (PAMC-20) and its adduct with the 2n moles of the diacrylate of 1,6 hexamethylene diol to form a polymeric imine-acrylate. Second, the polymeric imine-acrylate enters into another addition polymerization reaction with the 4n epoxide equivalents, resulting in a ladder like type formation. The steps can be described schematically as follows:

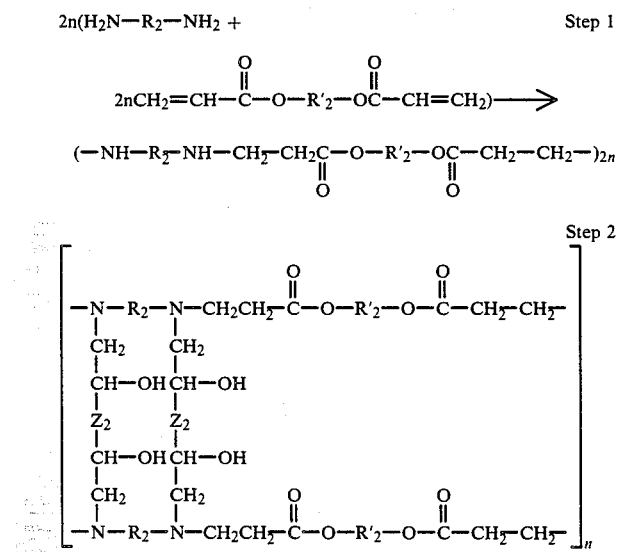

Wherein $R_2$, $R'_2$ and $Z_2$ are divalent radicals corresponding in Step 1 and Step 2 to the specific structures of:

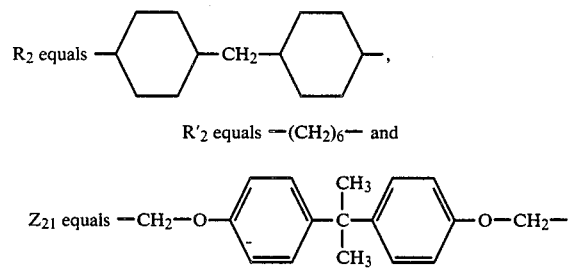

The CYMEL-301 is 1% by weight of the total weights of components A and B and does not participate in any reaction, but it was found to significantly reduce surface tension and improve film characteristics. Thicker films have much less surface tension and do not require CYMEL-301.

EXAMPLE 2

In an 800 ml. glass beaker were placed 1.5 moles (174 grams) of 1,6 hexamethylene diamine and through a dropping funnel were added to it, under stirring and cooling 1.5 moles (381 grams) of 1,6 hexamethylene diol dimethyl acrylate to form a viscous polyimine-dimethylacrylate, designated component A. Separately component B was formed by simply mixing 1.5 moles (453 grams) of tetraoxoethylene glycol diacrylate and 10 grams of CYMEL-301. Component B had a viscosity of about 90 cps at ambient temperatures. The mixing ratio of component A to component B by weight is equal to A/B=555/463=1.2/1.0.

To 12 grams of component A were added 10 grams of component B and mixed for five minutes, then 146 grams of silicon dioxide (sand flour) and 3 grams of chrome green oxide were added to this mixture under continuous mixing. The pliable, plastic semisolid product was placed in aluminum cups and became solidified at ambient temperature within 4 hours. The final product was a hard, solid, green, glossy and smooth composite containing 87% by weight silicon dioxide. When this composite was exposed to an open flame it did not burn due to the 87% silicon dioxide content. It is believed that such composites based on components A and B of most of the following examples containing silicon dioxide, magnesium oxide, aluminum oxide, antimony oxides, and their like, are stronger than cement, and can be used in prefabricated houses or buildings.

Such composites also allow reinforcement with steel, and offer a variety of color choices, as well as heat and water insulation. Additionally, they do not shrink or expand significantly, and therefore do not crack. At less than ⅛ of the equivalent concrete thickness, they have excellent impact resistance and elminate the need for plastering, painting, insulation, water proofing and maintenance. Water, oil and gas piping of any diameter or wall thickness can also be made from these compositions.

EXAMPLE 3

In an 800 ml. glass beaker were placed 2.0 moles (420 grams) of PAMC-20, 1.0 mole (136 grams) of meta xylylene diamine, 1.0 mole (185 grams) of lauryl (or dodecyl) amine and 29.0 grams of CYMEL-301 and mixed for 10 minutes to form component A. Separately in another glass beaker were placed 7.0 epoxide equivalents (1260 grams) of EPON-828, 2.0 moles (424 grams) of neopentyl glycol diacrylate and 1.0 mole (296 grams) of trimethylol propane triacrylate, mixed for about 10 minutes and labeled component B. The stochiometrical weight ratio of component A and B in this case is A/B=770/1980=1/2.57.

In a high speed blender were placed 100 grams of component A, 305 grams titanium dioxide (Rutile type), 0.5 grams ultramarine blue and grinded for 15 minutes. Then 257 grams of component B were added and mixed for an additional 5 minutes. The resulting mixture was sprayed to bonderized steel panels in layers having thicknesses varying from 3 to 300 mils. The panels dried to touch within 3 hours and dried hard after 6 hours. Gloss was greater than 90% at a 60 degree angle. Direct and reverse impact resistance was greater than 190 psi. These steel panels were found to have excellent resistance to nitric acid, seawater and ultraviolet light, as well as outstanding gloss retention, all of which is attributed to the polyacrylate structure.

In another experiment, castings were made in metallic molds coated with carnauba wax or polyethylene boxes. These castings were more than 2 inches thick and solidified within 6 hours at ambient temperature or within 10 minutes at 130° C. These castings were highly transparent and tough.

EXAMPLE 4

In a 1500 ml. glass beaker were placed 30 grams Cymel-301, 1.0 mole (152 grams) N,N', methylene diacrylamide and 2.0 moles (426 grams) of tetradecyl amine and mixed until the exotherm ceased, thus forming a diiminediimide. Then 2.0 moles (420 grams) of PAMC-20, 1.0 mole (136 grams) of metaxylene diamine and 1.0 mole (116 grams) of Amine-6 were added and mixed for 5 minutes to form component A.

Component B was formed in another 3000 ml glass beaker by mixing 18 epoxide equivalents (1440 grams) of EPON-828, 2.0 moles (424 grams) of neopoentyl glycol diacrylate, and 0.67 moles (198 grams) of trimethylol propane triacrylate. The stochiometrical mixing weight ratio of component A to component B is equal to $A/B = 1167/2062 = 1/1.77$. When components A and B are mixed together they form polyimine acrylate at first which add to epoxides and form three dimensional polyhydroxyl tertiary amine-epoxy-propionates and N-substituted acrylamides.

It should be noted that instead of 0.67 moles of trimethylol propane triacrylate, 1.0 mole could be used to temporarily decrease cross-linking density to form a photoprepolymer. Further cross-linking can be promoted later through the use of an ultraviolet light.

Furthermore, the 1.0 moles of 1,6 hexamethylene diol diacrylate and the 2.0 moles neopentyl glycol diacrylate could have been replaced by 2.0 or 3.0 moles of trimethylol propane triacrylate. In the case of 2.0 moles of trimethylol propane triacrylate the cross-linking rate and density are rapidly increased, providing less pot life for the mixed system but faster setting at ambient temperatures. In the case of 3.0 moles of trimethylol propane triacrylate the pot life is typical of the other systems, but cross-linking continues after its application through the unreacted acrylic bond, for months or years by the ultraviolet light provided by the sun. In other words, it behaves like a "living" crosslinked polymer.

In another test, 20.62 grams of component B were mixed with 270 grams asphalt having a melting point of about 60° C. To this mixture were added 11.67 grams of component A, mixed for 5 minutes, and then 900 grams of silicone dioxide were added to the mixture, mixed and poured into concrete holes. After 3 hours the final composite was hard, and inspection of it several months later indicated no signs of cracking.

EXAMPLE 5

In an 800 ml. glass beaker were placed 0.5 epoxide equivalents (90 grams) of EPON-826 and 2.25 moles (462.5 grams) of PAMC-20, 8.0 grams of CYMEL-301 and mixed for 15 minutes to form component A. In another 1500 ml. glass beaker were placed 4 epoxide equivalents (700 grams) of Novolac-431, 2.0 moles (424 grams) of neopentyl glycol diacrylate, and mixed for 10 minutes to form component B. The mixing ratio of this solventless system of component A to component B is $A/B = 561/1124 = \frac{1}{2}$.

Ten grams of component A were mixed with 7.5 grams of zinc oxide and 2.5 grams of red oxide. To this mixture were added 20 grams of component B, mixed for an additional 5 minutes and then the mixture was applied to panels of wood, concrete, steel, aluminum, tin and glass to yield solventless thermosetting, glossy paints at ambient temperatures, even in the absence of titanium dioxide and grinding of the pigments.

EXAMPLE 6

In an 800 ml. glass beaker were placed 0.5 moles (300 grams) of Jeffamine D-600 and was called component A. In another 800 ml. glass beaker were placed one epoxide equivalent (175 grams) of Novolac-439, 0.35 moles (125 grams) of pentaerythritol tetra acrylate and mixed for 15 minutes to form component B. The mixing stochiometrical weight ratio of component A to component B for this system is equal to $A/B = 1/1$.

The thermosetting solid polymer resulting from the mixing of equal parts of component A to B is a "living" one, because of the total $0.35 \times 4 = 1.4$ acrylic linkages, only 1.0 of them were added to amine, leaving 0.4 out of 1.4 or about 28.6% free to polymerize over any period of time with the sun's ultraviolet light. The long chain linkages of the final product also provide excellent flexibility and resiliency, which is maintained at very low temperatures.

EXAMPLE 7

In an 800 ml. glass beaker were placed 1.0 mole (403 grams) of Jeffamine T-403, which is polyoxopropylene triamine, and to it were added 1.0 mole (53 grams) of acrylonitrile, under mixing and cooling with water to form component A. Separately in another 1000 ml. glass beaker were placed 3.0 epoxide equivalents (540 grams) of EPON-826, 1.0 mole (330 grams) of tetraethylene glycol dimethyl acrylate, 13 grams of CYMEL-301 and mixed for 15 minutes to form component B. The mixing weight ratio of $A/B = 456/883 = 1/1.94$. 10 grams of component A were mixed with 19.4 grams of component B to form an excellent adhesive for glass, steel and wood.

EXAMPLE 8

Component A was made by mixing in a glass beaker 0.5 moles (500 grams) of Jeffamine D-1000 and 0.25 moles (8 grams) of hydrazine. Component B was made in another beaker by mixing 1.5 epoxide equivalents (270 grams) of EPON-826 with 0.50 moles (127.9 grams) of 1,6 hexamethylene diol dimethyl acrylate and 0.125 moles (44 grams) of pentaerythritol tetraacrylate. The mixing ratio of component A to component B of this system is $A/B = 508/442 = 1.15/1$.

When 11.5 grams of component A are mixed with 10 grams of component B they react to form cross-linked polyhydroxyl tertiary (amine and hydrazine) epoxyacrylates.

EXAMPLE 9

Component A was made by placing in an 800 ml. glass beaker 1.0 mole (403 grams) Jeffamine T-403, 12.5 grams of CYMEL-301, and slowly adding to it 0.25 moles (82.5 grams) of tetraoxoethylene glycol dimethyl acrylate. Component B was made in another beaker by mixing 3.0 epoxide equivalents (540 grams) of EPON-826 and 1.25 moles (272.25 grams) of 1,6 hexamethylene diol diacrylate. The weight ratio of component A to component B of this system is $A/B = 1/1.63$.

Ten grams of component A were mixed with 16.3 grams of component B to form six batches and 11, 24.6, 26.7, 40.5, 55.6, and 106.8 grams of chopped glass fiber or fiber cloth were respectively added to the batches. The resulting mixtures were pressed in polyethylene molds to form castings consisting of 30/70, 40/60, 42/58, 60/40, 70/30 and 80/20 glass to resin ratios.

Similar castings were made with general purpose unsaturated polyesters cured with ketone hydroperoxides as well as with EPON-828 and Versamides (amino-terminated polyamides based on dimer fatty acid and triethylene tetra amine condensates). Straight comparisons between all of these specimens measured by impact resistance and resilience suggests that the solventless liquid system of the present invention was better than the epoxide-Versamide 1 and unsaturated polyesters. Based on these findings, as well as in the outstanding adhesion of the solventless system to glass, it will be apparent to those skilled in the art that the solventless systems of this invention are especially adaptable for use as binders for reinforced plastics used in the construction of yachts, storage tanks, pipes, corrugated sheets, fishing lures, bowling balls, etc. Additionally, bridge or construction columns of better strength seem to be feasible. In addition to glass fibers, other filler materials such as graphite, Kevlar or metallic fibers can be also used.

EXAMPLE 10

In an 800 ml. glass beaker were placed 1.0 mole (60 grams) of ethylene diamine, 1.0 mole (216 grams) of azelaic hydrazide, and under mixing and cooling were added 0.8 moles (203.2 grams) of 1,6, N,N' dimethyl hexamethylene diol diacrylate. Two hours later 0.4 moles (28.4 grams) of acrylamide were added and mixed for additional 30 minutes to form component A, having an oligomeric polyamine-hydrazide amide ester structure, and an amine equivalent of 84.6. Component B was formed by using 2 epoxide equivalents (360 grams) of EPON-826 diluted with 2.0 moles (284 grams) of glycidyl ester of methyl acrylic acid and 11 grams of CYMEL-301. The mixing equivalent weight ratio of component A to B is equal to 507.6/655=0.77/1.

When 7.7 grams of component A are mixed with 10 grams of component B they form cross-linked polyhydroxyl tertiary (amine and hydrazine) epoxy acrylates.

EXAMPLE 11

In a 2000 ml. glass beaker were placed 2.0 moles (232 grams) of Amine-6, 0.5 moles (165 grams) of oxotetraethylene diol dimethyl acrylate, 1.0 mole (152 grams) of N,N' methylene diacrylamide, 23 grams of CYMEL-301 and mixed to form component A. Component B was formed by mixing 2.5 moles (565 grams) of 1,6 hexamethylene diol diacrylate and 6.0 epoxide equivalents (1080 grams) of EPON-828 or simply using 5.0 moles (710 grams) of glycidyl ester of methyl acrylic acid, or 5 moles (1130 grams) of 1,6 hexamethylene diol diacrylate or their combined mixtures.

As is shown in this example it is possible to vary the ratios and the ingredients of component B or A to achieve desired viscosities, ratios and properties.

EXAMPLE 12

Component A was formed by mixing 0.5 moles (410 grams) of dimer fatty acid condensate (which was formed from the reaction of 1.0 mole (564 grams) dimer fatty acid with 2.0 moles (292 grams) of triethylene tetramine), 2.5 moles (388 grams) of trimethyl 1,6 hexamethylene diamine and 32 grams of CYMEL-301. Similarly, component B was made by mixing 8 epoxide equivalents (1440 grams) of DOW-431 Novolac, 2.0 moles (452 grams) of 1,6 hexamethylene diol diacrylate and 1.0 mole (302 grams) of oxotetraethylene diacrylate. The equivalent weight ratio of component A and B are A/B=830/2194=1/2.64.

When 10 grams of component A are mixed with 26.4 grams of component B they form polyhydroxyl amides-tertiaryamine-epoxy-acrylates.

Similarly, component A was made by mixing 1.0 mole (592 grams) of dimer fatty hydrazide, 3.0 moles (630 grams) of PAMC-20, 33 grams of CYMEL-301 and 0.5 epoxide equivalent (90 grams) of EPON-828 at ambient temperatures. Component B was prepared by mixing 7.5 epoxide equivalents (1350 grams) of EPON-828 dissolved in 4.0 moles (848 grams) of neopentyl glycol diacrylate. The equivalent weight ratio of component A to component B is equal to A/B=1345/2198=1/1.63.

Ten grams of component A were mixed with 16.3 grams of component B and a thin layer of this was applied to bond together two pieces of wood. The next day signficant force was used to take apart the two wooden pieces, and it was found that all the fibers of the bonded wooden surface were totally removed suggesting that the adhesive bond was much stronger than wood. Similarly impressive results were obtained by adhering tiles, bricks, concrete, steel, glass, polyvinyl chloride, polycarbonate, polyesters, epoxide and polystyrene pieces as individual and combined pieces. The absence of solvents in the present invention provides a compact continuous bond while low viscosity penetrates the substrate thus resulting in outstanding adhesion.

EXAMPLE 13

In a 1000 ml. glass beaker were placed 3.0 moles (430 grams) of PAMC-20, and 1.0 mole (213 grams) of tetradecyl amine and 32 grams CYMEL-301 and mixed for 20 minutes to form component A. Separately, in another glass beaker were mixed 7 epoxide equivalents (1260 grams) of EPON-826, 2.0 moles (424 grams) of 1,6 hexamethylene diol diacrylate, 1.0 mole (296 grams) trimethylol propane triacrylate and 92 grams of ortho cresol to form component B. The mixing ratio of component A to component B was A/B=875/2100=1/2.4 and the ortho cresol catalyst was 4.38% by weight of component B and 3.1% by weight of the combination of components A and B.

Upon mixing 10 grams of component A with 24 grams of B a rapid increase in viscosity occurs within 15 minutes and the mixture thermosets to touch free in 40 minutes.

In another experiment the ortho cresol was replaced with phenol, chloro phenol, nonyl phenol, ortho dinitro cresol, para dinitro cresol, hydroquinone, dibutyl hydroquinone and Bisphenol-A. It was observed that the thermosetting time of component A and mixtures was decreased as the acidity and the quantity of phenolic compound used increased. Accelleration of thermosetting time at ambient temperatures shortens the pot life of the mixed components A and B and it becomes impractical for brushing applications; however, it is efficient and practical when a dual mixing spray gun is utilized which will limit mixing time of component A and B to a satisfactorily short period of time.

EXAMPLE 14

In a 1000 ml glass beaker were placed 3.0 moles (630 grams) of PAMC-20, 1.0 mole (213 grams) of tetradecyl amine and 32 grams of CYMEL-301 and mixed for 30 minutes to form component A. Separately, in another glass beaker, were mixed 7 epoxide equivalents (1260 grams) of EPON-828, 2.0 moles (452 grams) of 1,6 hexamethylene diol diacrylate, 1.0 mole (296 grams) of trimethylol propane triacrylate and 1100 grams of ortho dinitrocresol to form component B. The mixing ratio of component A to B was A/B=875/3108=1/3.55.

This was sprayed by using a dual, airless gun to form a fast, thermosetting, yellow, solventless varnish.

The same experiment was repeated by using 875 grams of component A which were mixed with 1197 grams titanium dioxide and 3108 grams of component B. This mixture was sprayed by an airless gun to form an antifouling paint which thermoset in less than 50 minutes.

EXAMPLE 15

In a 2000 ml. glass beaker were placed 1.0 mole (136 grams) of meta xylyene diamine, 0.67 grams of hydroquinone inhibitor, and were added under constant mixing 4.0 moles (1208 grams) of oxotetraethylene glycol diacrylate under continuous stirring for about 2 hours to form a photoprepolymer, which after the addition of 13.4 grams (1% by weight) of p,p' dichlorobenzoquinone photoinitiator was stored in dark-colored bottles at ambient temperatures. It should be noted that the photoprepolymers of this invention do not require addition of photo accellerators such as tertiary amines inasmuch as they are already built into the molecule.

Clear or lightly filled with silica flour solutions of this photoprepolymer were poured in aluminum cups to form layers 2 to 4 mils thick. When exposed to ultraviolet light, these solutions thermoset within a few seconds at ambient temperatures to form clear, transparent and resilient films. The same experiment was repeated by using 1.0 mole (116 grams) of Amine-6 and 3.0 moles (678 grams) of 1,6 hexamethylene diol diacrylate and gave similar results.

EXAMPLE 16

In an 800 ml. glass beaker were placed 1.0 mole (213 grams) tetradecylamine, 0.256 grams of monohydroxyl ethylene hydroquinone inhibitor, 1.0 mole (296 grams) of trimethylol propane triacrylate, and mixed for about two hours. This was followed by the addition of 5.13 grams of p,p' dichlorobenzoquinone photointiator to form a photoprepolymer, which was stored in a dark container at ambient temperatures. Thin, clear or lightly filled films of this solution alone or as a mixture with mono or polyfunctional acrylates thermoset upon exposure for a few seconds to ultraviolet or electron beam light.

EXAMPLE 17

In an 800 ml. glass beaker were placed 1.0 mole (105 grams) of diethanol amine, 0.2 grams of ditertiary butyl hydroquinone inhibitor, 1.0 mole (296 grams) of trimethylol propane triacrylate. The solution was mixed for about two hours, followed by the addition of 4 grams of p,p' dichlorobenzophenone to form a difunctional photoprepolymer. When films of this photoprepolymer were exposed to ultraviolet light they were cross-linked to form polyhydroxyl tertiary amine saturated acrylates through the photo addition polymerization of the acrylic linkages.

The same experiment was repeated by replacing the 1.0 mole of trimethylol propane triacrylate with 1.0 mole of pentaerythritol tetra acrylate to form a trifunctional acrylate. Again, after the addition of 1% by weight of photoinitiator and in the absence of any photo accellerator these photoprepolymers thermoset upon exposure for a few seconds to ultraviolet light or electron beam.

EXAMPLE 18

In an 800 ml. glass beaker were placed 1.0 mole (144 grams) of 1,6 N,N' dimethyl hexamethylene diamine, 0.4 grams of hydroquinone inhibitor, 2.0 moles (604 grams) of tetraoxoethylene diol diacrylate. The solution was mixed for about two hours followed by the addition of 7.5 grams p,p' dichlorobenzoquinone photoinitiator to form a tertiary amine diacrylate photoprepolymer having a molecular weight of 748. This photoprepolymer was converted by UV light to a cross-linked polyamine saturated acrylate through the photo addition of the acrylic linkages.

The same experiment was repeated by replacing the 1.0 mole of 1,6 N,N' dimethyl hexamethylene diamine with the adducts of 1.0 mole of Amine-6 to 2.0 moles of acrylonitrile or 1.0 mole of PAMC-20 to 2.0 moles of acrylamide and the partial or total replacement of the 2.0 moles of oxotetraethylene diol diacrylate with neopentyl glycol diacrylate, butylene diol diacrylate, or 1,6 hexamethylene diol diacrylate. Again these photoprepolymers, after the addition of 1% by weight of photoinitiator and in the absence of any photoaccellerator, thermoset upon exposure for a few seconds to ultraviolet light or electron beam.

EXAMPLE 19

In a 3000 ml. glass beaker were placed 2.0 moles (232 grams) of Amine-6, 2.0 moles (632 grams) of tetraoxoethylene dimethyl acrylate and mixed at ambient temperatures for about 3 hours until an extremely viscous material was developed. Under cooling and continuous mixing were added 4.0 moles (616 grams) of hexahydrophthalic anhydride, diluted with 5 equivalents (730 grams) of dimethylcyclohexamethylene diepoxide glycolate and mixed at ambient temperatures to form a homogenous semi-solid polyester, N-substituted amide carboxylic acid mixture in a cycloaliphatic liquid diepoxide. This system is one component, solventless, and stable on storage at ambient temperatures, thermosetting upon heating at about 150° C. through an addition polymerization involving the opening of the epoxide ring with the carboxylic group. Each epoxide equivalent corresponds to 0.8 or 1.0 carboxylic groups and the reason that 1/0.8 ratios can be used is that the hydroxy groups formed from the epoxide ring opening react with other epoxide groups to form hydroxyl ethers.

The same experiement was repeated by replacing the 2.0 moles of Amine-6 with 2.0 moles (420 grams) of PAMC-20, while leaving the other components unchanged. 300 grams of the low melting poly-oxo-ester N-substituted hexahydrophthalamide carboxylic acid, cycloaliphatic diepoxide were mixed with 2100 grams of aluminum trihydrate under heating at about 90° C. to fluidize and homogenize the final mixture, which upon cooling was solidified and grinded to a fine powder. Heating of this powder at above 150° C. for at least 30 minutes thermoset to form a composite having outstanding tracking resistance to high voltage, as a result of combining the aluminum trihydrate with a totally saturated cycloaliphatic structure.

The same experiments were repeated by using phthalic, succinic, docecenyl succinic, maleic or trimellic anhydride instead of hexahyddrophthalic anhydride and Novolac DOW-431 instead of cycloaliphatic diepoxide. Instead of aluminum trihydrate, oxides of zinc, iron, magnesium, antimon, the dioxides of titanium, silicon and chrome green oxide were used to form powder, solventless paints polymerizable by an addition polymerization upon heating at about 150° C. However, optimum non-tracking properties are only obtained from the combination of saturated structures in combination with aluminum trihydrate. Aromatic structures are considered unsaturated in non-tracking applications, and are less suitable for high voltage applications.

EXAMPLE 20

Several monoamines were synthesized by using a 2.0 liter glass resin kettle equipped with a mechanical stirrer, a thermocouple connected to a temperature recorder, a water trap, a vertical condenser and a heating mantle.

Flexible liquid imide monoamines were made by using the following combinations: 2.0 moles (296 grams) phthalic anydride added slowly to 1.0 mole (403 grams) of Jeffamine T-403 and then heated up to 180° C. until 2.0 moles (36 grams) of water were collected. The resulting product was a bis-phthalimide polyoxopropylene amine having a molecular weight of 663. Similarly, 2.0 moles (536 grams of dodecyl succinic anhydride were reacted with 1.0 mole (403 grams) of Jeffamine T-403 to form a diimide primary amine was formed. Using 1.0 mole tetrahydrophthalic anhydride, 1.0 mole pelargonic acid and 1.0 mole of Jeffamine T-403, an amide-imide primary amine. The reaction of 1.0 mole (60 grams) urea with 1.0 mole (61 grams) mono ethanol amine results in 1.0 mole monoethanol urea through the elimination of 1.0 mole of gaseous ammonia, which upon further reaction with 1.0 mole (230 grams) of Jeffamine-230 through the elimination of 1.0 mole of gaseous ammonia results in 1.0 mole of hydroxyl ethyl urea polyoxopropylene amine, having a molecular weight of 317.

Other imide or amide mono primary amines can be formed from the condensation of 1.0 mole of succinic anhydride and Jeffamine D-400 (an oxopropylene diamine) through the elimination of 1.0 mole of water. Instead of succinic, anhydride, other anhydrides such as methyl hexahydrophthalic, maleic, glutaric, or itaconic anhydrides can be used. Instead of Jeffamine-230, trimethyl hexamethylene diamine, isophorone diamine, PAMC-20 or meta xylene diamine can be used in a 1/1 molar ratio with mono anhydrides to form mono imide primary amines. Monocarboxylic acids, such as formic, acetic, 2-ethyl hexanoic, lauric, stearic, oleic, furoic, benzoic, or their methyl esters can be condensed in 1/1 molar ratio with ethylene diamine, 1,6 hexamethylene diamine, 1,6 trimethyl hexamethylene diamine, isophorone diamine, PAMC-20, Jeffamines (230, 400, 600, 800, 1000 and 2000) to form mono amide amines that are useful as ingredients as such or as their mixtures in the component A of the solventless two component system.

Also, the reaction of 1.0 mole (135 grams) of sulfonyl dichloride with 1.0 mole (169 grams) of diphenyl imine, followed by the addition of 1.0 mole of Jeffamine D-400 results in a sulfonyl amide-amine having a molecular weight of 633. An example of hydrazide amine was produced by adding 1.0 mole (50 grams) of hydrazine monohydrate to 1.0 mole (214 grams) of methyl ester of lauric acid at ambient temperature and azeotroping the water and methanol with cyclohexane. The resulting hydrazine amine has a molecular weight of 214.

Another dihydrazide mono amine is obtained by reacting 1.0 mole (176 grams) of the dihydrazide of adipic acid with 1.0 mole (298 grams) methyl ester of stearic acid until 32 grams of methanol were removed.

EXAMPLE 21

In a two liter resin kettle were placed 1.0 mole (166 grams) of terephthalic acid, 1.0 mole (146 grams) of phthalic anhydride and 2.0 moles of polyoxopropylene diamine-400 (Jeffamine D-400) and heated to 180° C. until 3.0 moles (54 grams) of water were condensed. Heat was turned off and the final product was a mono primary amine, imidediamide.

The same experiment was repeated by placing 2.0 moles (420 grams) of PAMC-20 with 1.0 mole (60 grams) of urea to form a urea diamine having a molecular weight of 446. Also, at ambient temperature to 90° C., 2.0 moles (460 grams) of polyoxopropylene diamine-230 (Jeffamine D-230) with 1.0 mole (146 grams) of diethyl oxalate were reacted to form an oxalamide diamine having a molecular weight of 514. Replacement of the 2.0 moles (460 grams) Jeffamine D-230 with 2.0 moles (806 grams) polyoxotriamine-400 (Jeffamine T-403) and 1.0 mole diethyl oxalate results in an oxalamide tetramine having a molecular weight of 860.

In the same resin kettle were placed 3.0 moles (474 grams) 1,6 trimethyl hexamethylene diamine, and 2.0 moles (376 grams) of azelaic acid and heated up to 200° C. until 4.0 moles of water were removed and a diamine terminated oligomeric poly-amide having an average molecular weight of 769 was formed. Similarly, other diamines or polyamine terminated compositions were prepared from the condensation reaction between the following: 1.0 mole of sebacic acid with 2.0 moles of 1,6 hexamethylene diamine, 1.0 mole of adipic acid with 2.0 moles of trimethyl 1,6 hexamethylene diamine, 1.0 mole of azelaic acid with 2.0 moles of diethylene triamine and 1.0 mole of dimer fatty acid with 2.0 moles of triethylene tetraamine. Also, 1.0 mole of sulfonyl chloride was condensed with 2.0 moles of trimethyl, 1,6 hexamethylene diamine, PAMC-20 or polyoxopropylene diamine-400 to form amide or sulfonamide diamines. All the amine terminated compounds alone, or as mixtures with simple mono, di or poly amines, can be used as the main ingredient in preparing the component A of the liquid solventless system.

EXAMPLE 22

A liquid and low melting mono hydrazide was made by mixing 1.0 mole (242 grams) of the methyl ester of tetradecanoic acid, 1.0 mole (50 grams) of hydrazine monohydrate, and heating the mixture up to 90° C. to remove 1.0 mole of methanol and 1.0 mole of water to form the monohydrazide of tetradecanoic acid.

Dihydrazides were also made from the condensation reactions between 1.0 mole of the dimethyl esters of sebacic acid, dodecenedioic acid, or dimer fatty acid and 2.0 moles of hydrazine through the elimination of 2.0 moles of methanol.

A trihydrazide was also made from the condensation of 1.0 mole of trimer fatty acid with 3.0 moles of hydrazine.

These mono, di or tri hydrazides readily react at ambient temperatures with mono, di or functional acrylates, epoxides, or glycidyl ether of methyl acrylic acid. They can be used alone or with simple amines as the main ingredients to form component A of the solventless system. It was found that hydrazide and oxalamide linkages further enhance the chemical and mechanical performance properties of the thermoset solventless system.

EXAMPLE 23

In a two liter resin kettle equipped with a mechanical stirrer, a thermocouple connected to a temperature recorder and a vertical condenser attached to a polyethylene tube ending in a water container were placed 8 moles (928 grams) of 2-methyl, 1,5 pentamethylene diamine and 4.0 moles (240 grams) of urea. This mixture was heated for 5 hours at a temperature between 120° C. and 180° C. under continuous stirring until 8 moles (136 grams) of gaseous ammonia were evolved. The resulting product was N',N' bis 2-methyl, 1,5 pentamethylene diamine urea having a molecular weight of 258.

Component A was formed by mixing 1.0 mole (213 grams) of tetradecyl amine and 1.0 mole (296 grams) of trimethylolpropane triacrylate for about one hour at ambient temperatures to form a tertiary amine linear polyacrylate to which was then added 1.5 moles (387 grams) of N',N' bis 1,5 pentamethylene diamine urea.

Components B was formed by mixing three epoxide equivalents (540 grams)/of the condensation product of epichlorohydrin and bisphenol-A of CYMEL 301, 15 grams of orthocresol and 1.0 mole (226 grams) of hexane diol diacrylate. The mixing ratio of component A to component B was A/B=896/781=1.15/1.

EXAMPLE 24

In a two liter resin kettle equipped as described in Example 23 were placed 6.0 moles (1260 grams) of PAMC-20 and 3.0 moles (180 grams) of urea. The mixture was heated for five hours under continuous mixing at a temperature of from 120° C. to 180° C. to eliminate 6.0 moles of gaseous ammonia to form the bis p,p' methylene cyclohexane symmetrically substituted urea diamine having a molecular weight of 446.

Component A was formed by mixing 1.0 mole (213 grams) of tetradecyl amine with 2.0 moles (452 grams) of 1.6 hexane diol diacrylate followed by the addition of 2.0 moles (892 grams) of N,N' p,p' methylene cyclohexane urea diamine, 1.5 moles (315 grams) of p,p' methylene cyclohexane diamine and 38 grams of CYMEL 301. The resulting product had a total weight of 1910.

Component B was formed by mixing seven epoxide equivalents (1260 grams) of EPON-826, 1.5 moles (339 grams) of 1,6 hexane diol diacrylate, 1.0 mole (296 grams) of trimethylol propane triacrylate and 15 grams of orthocresol. The weight of this mixture was 1910. The mixing ratio of A/B was 1/1.

EXAMPLE 25

In a two liter glass resin kettle equipped with a mechanical stirrer, a thermocouple connected to a temperature recorder, a water trap, a nitrogen tube inlet and a vertical water condenser were placed 10 moles (1160 grams) of 2-methyl 1,5 pentane diamine. Under continuous mixing and cooling 5.0 moles (500 grams) of ethyl acrylate were slowly added over a period of about 2 hours. The temperature was then raised to 160°-180° C. and maintained until 5.0 moles (230 grams) of ethyl alcohol were collected. The resulting compound was a triamine-monoamide composed of two primary and one secondary amino groups having a molecular weight of 286 and an amine value of 57.2. The compound is beta 2-methyl 1,5 pentane diamine of propionamido, 2 methyl pentane amine - 1.

Additional compounds were formed by replacing 2-methyl 1,5 pentane diamine with 1,6 hexane diamine. Also, ethyl acrylate was replaced with methyl acrylate, acrylic acid, ethyl methyl acrylate, methyl methacrylate or methyl acrylic acid. In the cases of methyl acrylic derivatives, triamines of alpha methyl propionamide were produced.

Component A was formed by using 286 grams of the propionamide triamine of 2 methyl 1,5 pentane diamine and 14 grams of CYMEL 301. Component B was formed by mixing 540 grams of EPON-828, 226 grams of 1,6 hexane diol diacrylate and 11 grams of ortho cresol. The mixing weight ratio of A/B=1/2.59. When mixed together, these components produced solventless clear varnishes, adhesives, paints, and composites thermosetting at ambient temperatures.

EXAMPLE 26

In the resin kettle equipped as described in Example 25 were placed 4.0 moles (400 grams) of methyl methacrylate and under continuous mixing and cooling, 2.0 moles (232 grams) of 1,6 hexamethylene diamine were slowly added through a dropping funnel over a period of about two hours time. 4.0 moles (464 grams) of 1,6 hexamethylene diamine were then added at once, and the mixture was heated to 160° to 180° C. for about two hours until 4.0 moles (128 grams) of methanol were collected. The final composition was a diamide-tetraamine containing two primary, two secondary amino groups and two amide groups. It had a molecular weight of 484, an amine value of 80.66 and was represented by the following structure:

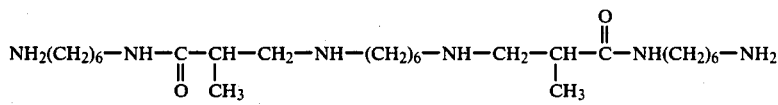

Additional compounds were formed by totally or partially replacing 1,6 hexamethylene diamine with 2-methyl 1,5 pentane diamine and by replacing methyl methacrylate with ethyl methacrylate, ethyl acrylate, acrylic acid, methyl acrylic acid or methyl acrylate.

EXAMPLE 27

In a resin kettle equipped as described in Example 25 are placed 2.0 moles of methyl methacrylate and under continuous mixing and cooling, 2.0 moles of 1,6 hexamethylene diamine are slowly added through a dropping funnel over a period of about two hours. 2.0 moles of 1,6 hexamethylene diamine are then added at once and the mixture is heated to 160° to 180° C. for about two hours until 2.0 moles of methanol are collected.

Additional compounds can be formed by totally or partially replacing the 1,6 hexamethylene diamine with 2-methyl 1,5 pentane diamine or by replacing the methyl methacrylate with ethyl methacrylate, ethyl acrylate, acrylic acid, methyl acrylic acid or methyl acrylate.

What is claimed is:

1. A copolymer comprising the addition reaction product of:
   a first solventless component comprising an adduct of a mono, di or polyamine with a mono, di or polyfunctional acrylate or epoxide or mixtures thereof; and
   a second, solventless component comprising a di or polyacrylate or mixture thereof, or a mixture of a di or polyacrylate and a glycidyl ester of acrylic acid or methacrylic acid.

2. A copolymer as defined in claim 1 wherein the first component is an adduct of p,p'methyl dianiline with hexane diol diacrylate and the second component is a mixture of hexane diol diacrylate and the condensation product of epichlorohydrin and bisphenol-A.

3. A polymerizable composition as defined in claim 1 wherein the first and second components are mixed together in substantially stoichiometric proportions such that the number of aminic hydrogens is substantially equal to the number of acrylic linkages plus epoxides.

4. A polymerizable composition as defined in claim 1 wherein the first and second components are liquids having a viscosity below about 1500 centipoise at about 25° C.

5. A polymerizable composition as defined in claim 1 wherein the first and second components thermoset to dry-through consistency when mixed together at a temperature of about 25° C. in about 1 to about 8 hours.

6. A polymerizable composition as defined in claim 1 further comprising from about 1 to about 3 percent wt. hexakis methoxy methylene melamine as a surface tension reducer.

7. A polymerizable composition as defined in claim 1 wherein the mono, di or poly functional amine has an aliphatic, cycloaliphatic, heterocyclic or aromatic structure represented by the general formulas $R_n(NH_2)_n$ or $R_n(NHR_1)$ wherein the $R_n$, $R_1$ radicals are composed of carbon and hydrogen atoms in simple amines and nitrogen, oxygen, sulfur, and halogen derivatives thereof in amine terminated compounds containing amide, imide, amide-imide, oxo, ketone, nitrile, sulfone, thiol, urea, or hydroxyl, backbone linkages and wherein n is an integer.

8. A polymerizable composition as defined in claim 1 wherein:
   said monoamine is selected from the group consisting of ethanol amine, diethanol amine, 2-ethyhexyl amine, dodecyl amine, tetradecyl amine, hexadecyl amine, octadecylamine, furfuryl amine, cyclohexylamine, aniline, chloro aniline, and the condensation products of n moles of 1,6 hexamethylene diamine, trimethyl hexamethylene diamine, isophorone diamine, or polyoxopropylene-230, 400, 600, 800, 1000, 2,000 diamines with n moles of a monofunctional anhydride selected from the group consisting of dodecenyl succinic anhydride, phthalic anhydride, tetrahydrophthalic anhydride, hexahydrophthalic anhydride, maleic anhydride, succininc anhydride, and itaconic anhydride, or n moles of an acid selected from the group consisting of 2-ethyl hexanoic acid, pelargonic acid, dodecanoic acid, octadecanoic acid, furoic acid, benzoic acid, hydroxy acetic acid, and formic acid, or lower esters, substituted derivatives, higher or lower homologues thereof, or the amide-imide amine of polyoxypropylenetriamine-400, or a monohydrazide of dodecanoic acid, 2-ethyl hexanoic acid, or octadecanoic acid;
   said diamine is a simple diamine selected from the group consisting of hydrazine diamine, ethylene diamine, butylene diamine, hexamethylene diamine, 2-methyl, 1,5 pentane diamine, trimethyl hexamethylene diamine, isophorone diamine, cyclohexamethylene diamine, xylene diamines, p,p' methylene dianiline, metaphenylene diamine, oxo or sulfone dianiline, their isomers, halo, ester and ether anologues, higher or lower homologues and substituted derivatives, and the adduct of n mole of the above amines with n or 2n moles of at least one monofunctional acrylate or methacrylate selected from the group consisting of hydroxyethylene acrylate, acrylamide, acrylonitrile, methyl acrylonitrile, and the adducts of n moles of a difunctional acrylate or methacrylate selected from the group consisting of butene diol diacrylate, neopentyl glycol diacrylate, 1,6 hexamethylene diol diacrylate, oxydiethylene diacrylate, oxotetra ethylene glycol diacrylate, dihydrazides and the diamide-amines obtained from the condensation of n moles of dimer fatty acid, dodecenedioic acid, sabacic acid or their dimethyl esters with 2n moles of hydrazine or 2n moles of a diamine of above simple diamines with the sulfone, urea or amide imide diamines obtained from the condensation of n moles of sulfuryl chloride, urea, or trimellitic anhydride with 2n moles of Amine-6, hexamethylene diamine, methylene bis cyclohexamethylene diamine, polyoxypropylene diamines 230, 400, 600, 800, 1000, 2000; and
   said amine is a tri or poly amine selected from the group consisting of diethylene triamine, dipropylene triamine, triethylene tetraamine, tetraethylene pentamine, polyoxypropylene triamine-400, 2,4-bis(p-aminobenzyl) aniline, and condensates thereof with dicarboxylic or tricarboxylic acids and their lower esters with acids selected from the group consisting of oxalic acid, adipic acid, azelaic acid, sebalic acid, sebacic acid, dodecedioc acid, dimer fatty acids, isophthalic and terephthalic acids, trimellitic anhydride, trimesic acid, sulfuryl chloride, or urea at a molar ratio of 2 to 1 of di or tri poly amine to difunctional acid or ester or a molar ratio of 3 to 1 or di or tri poly amine to a trifunctional acid or ester.

9. A polymerizable composition as defined in claim 1 wherein:
   said acrylate is a monofunctional acrylate selected from the group consisting of hydroxyl ethylene acrylate, hydroxyl propylene acrylate, acrylonitrile, acrylamide, methylol acrylamide, dimethylol acrylamide, diacetone acrylamide, methyl acrylate, ethyl acrylate or butyl acrylate, methyl and alkyl derivatives thereof, and the analogues of crotonic acid;
   said difunctional acrylate is selected from the group consisting of butane diacrylate, neopentyl diacrylate, 1,6 hexamethylene diacrylate, oxo diethylene diacrylate, oxo triethylene diacrylate, oxo tetraethylene diacrylate, polyoxoethylene diol diacrylates or dimethyl acrylates, and di, tri or poly oxo propylene diol diacrylates or dimethyl acrylates, N,N' methylene bis acrylamide, N,N' methylene bis methyl acrylamide, and the adducts of n moles of an amine or an ethanol imine with n moles of a triacrylate; and said tri functional acrylate or methyl acrylate is selected from the group consisting of trimethylol propane triacrylate, pentaerythritol triacrylate, the tetra acrylate or methyl acrylate of pentaerythritol; the adducts of n moles of an imine with n moles of pentaerythritol tetracrylate or tetramethyl acrylate; and the adducts of n moles of a di-imine or n moles of a primary amine with 2n moles of a di, tri or polyacrylate or methyl acrylate, and the adducts of n moles of primary diamines with 3n or 4n moles of a di, tri or tetra functional acrylate or methyl acrylate.

10. A polymerizable composition as defined in claim 1 in which said epoxide is selected from the group consisting of ethylene, propylene, butene, styrene, and cyclohexamethylene oxides; aliphatic diepoxides; diglycidyl ether or bishenol A; terephathalic acid; aniline, novolac, phenol and cresol di epoxides; glycolate or adipates of dicyclohexamethylene and dimethyl cyclohexamethylene diepoxides; the halo and alkyl substituted derivatives, isomers, and higher or lower analogues of the above.

11. A polymerizable composition as defined in claim 1 wherein the first component is formed by mixing 2n moles of a monoacrylate with n moles of a first diamine to form a di imine diacrylate followed by the addition of 2n moles of second diamine to form a mixture which is heated to condense and evolve 2n moles of methanol.

12. A polymerizable composition as defined in claim 1 wherein the first component is formed by mixing n moles of a mono acrylate with n moles of a first diamine to form an amine-imine followed by the addition of n moles of a second mono amine to form a mixture which is heated to condense and evolve n moles of methanol, ethanol, ammonia or water.

13. A copolymer comprising the addition reaction product of a first component comprising a mono, di or polyamine, hydrazine, or an amino-hydrazine terminated derivative, or a mixture thereof with a mono, di or polyfunctional acrylate and a second component comprising a di or polyacrylate wherein the first and second components are mixed together in proportions such that the number of acrylic linkages are in excess of the aminic hydrogens so as to form a photoprepoymer which can be further polymerized by ultraviolet light or an electron beam.

* * * * *